July 24, 1973  F. W. WANZENBERG ET AL  3,748,248
DEEP SEA MINING SYSTEM
Filed Jan. 25, 1968  5 Sheets-Sheet 1

Fig. 1

INVENTORS
FREDERICK WHEELOCK WANZENBERG
FRITZ WALTER WANZENBERG
BY Grist, Lockwood, Greenawalt & Dewey
ATT'YS.

United States Patent Office 3,748,248
Patented July 24, 1973

3,748,248
DEEP SEA MINING SYSTEM
Frederick W. Wanzenberg and Fritz W. Wanzenberg, both of 9 Campbell Lane, Larchmont, N.Y.
Continuation-in-part of application Ser. No. 526,970, Feb. 10, 1966. This application Jan. 25, 1968, Ser. No. 700,470
Int. Cl. B01k 3/00
U.S. Cl. 204—208                                    35 Claims

ABSTRACT OF THE DISCLOSURE

A system for recovering minerals, mineral ores and their compounds from the bottom of the sea and other deep water areas which employs a sled-like unit having a reaction chamber with an open bottom adapted to be dragged along the ocean floor while the reaction chamber is supplied with solvents and/or reagents which will react with the minerals and/or ores and other mineral bearing materials desired to be recovered and means associated with the reaction chamber for collecting the desired materials in more concentrated form and for bringing them to the surface which includes subjecting mixtures of the desired materials and waste to electrical deposition and/or chemical segregation. In one form of the apparatus employed the desired materials on the ocean floor are treated with chemical solvents and reagents which will react with the minerals and/or the compounds sought and mixtures of the solution and reaction products with some waste forming material are brought to the surface for extraction of the desired products by electrolytic deposition and segregation in a surface unit.

This application is a continuation-in-part of application Ser. No. 526,970, filed Feb. 10, 1966, now abandoned.

This invention relates to mining and is more particularly concerned with a unique system for recovering metals and minerals from oceans, lakes or rivers which employs solution chemistry, solvent extraction and electro-deposition, with the recovered materials being in the form of cathode deposits, electro separated granules or slimes which are removed to the surface for further processing.

Conventional methods employed heretofore for collecting minerals, in soluble and insoluble state, from bodies of water have generally involved dredging, drag-lines and bucket conveyors which are suitable for operations in shallow water areas only. No satisfactory methods have been developed for the commercial recovery of metals and minerals from reasonable to great depths. Most proposed methods have been found either uneconomical or impractical for recovering deeply deposited metals or their chemical compounds.

The principal object of the present invention is the provision of a system for mining in deep water locations which is economical and practical, wherein extraction of valuable metallic ions or fractions thereof is accomplished at the bottom of the sea or the floor of a lake or stream, by solution chemistry and solvent extraction and the isolation of the most valuable portions of mineral compounds by electro-deposition or electro-segregation so as to render them readily removable to the surface, thereby eliminating the need for moving gangue as well as the valuable fractions, and other cost incurring operations incident to normal dressing, smelting and refining operations.

It is another object of the invention to provide a method and an apparatus whereby valuable metals are concentrated and converted from the ore to cathodic or anodic particles or solution ions at the bottom of the sea or beneath other deep bodies of water so as to facilitate removal to the surface for final processing.

Another object of the invention is to provide a mining system wherein solvents such as acids, bases, cyanides, fluorides, silico-fluorides, acid-sulphate solutions, alkalines, stannates, fluoborate solutions, pyro-phosphates, amine-complex solutions, etc., singly or in combination are added to mineral bearing nodules and ores at the bottom of the ocean or other bodies of water so as to permit ionization of the non-metallic and metallic materials trapped therein and enable the same to be readily brought to the surface.

It is a further object of the invention to provide an apparatus for recovery of minerals from the ocean floor which involves applying a potential between a fixed grid anode at or below the bottom surface and a fixed or replaceable cathode in juxtaposition near the anode in the environment of dissolved or ionized metallic or mineral compounds, with a solvent feeding mechanism which can be part of an electro-deposition mechanism all of which may be either stationary or movable after the manner of a sled, the cathode being in the form of sheets, coils, bars or strips which may be transported to the surface when electro-deposition is completed, and with the necessary electrical current supplied from a ship, a buoy or other surface installation.

A still further object of this invention is the use of closed circuit television to properly place stationary rigs or to guide mobile rigs in seeking the most productive sites or locations for mining.

Another object of the invention is to provide an apparatus for electro-deposition of ore particles which include traveling belts on a sled-like frame which may be arranged so that both anode and cathode deposits may be obtained if desired.

It is still a further object of the invention, in one form thereof, to provide an apparatus on the bottom of the ocean for crushing nodules and ore particles and mixing these particles with leeching solutions, acids and reagents on the ocean floor so that the solutes formed, or the dissolved or precipitated products of reaction, liberated gases, fine solids, etc. may then be removed to the surface where the valuable minerals can be extracted by electro-deposition, solvent extraction, mineral dressing and other conventional processing.

These and other objects and advantages of the invention will be apparent from a consideration of the method and apparatus which is shown by way of illustration in the accompanying drawings wherein.

Figure 1:
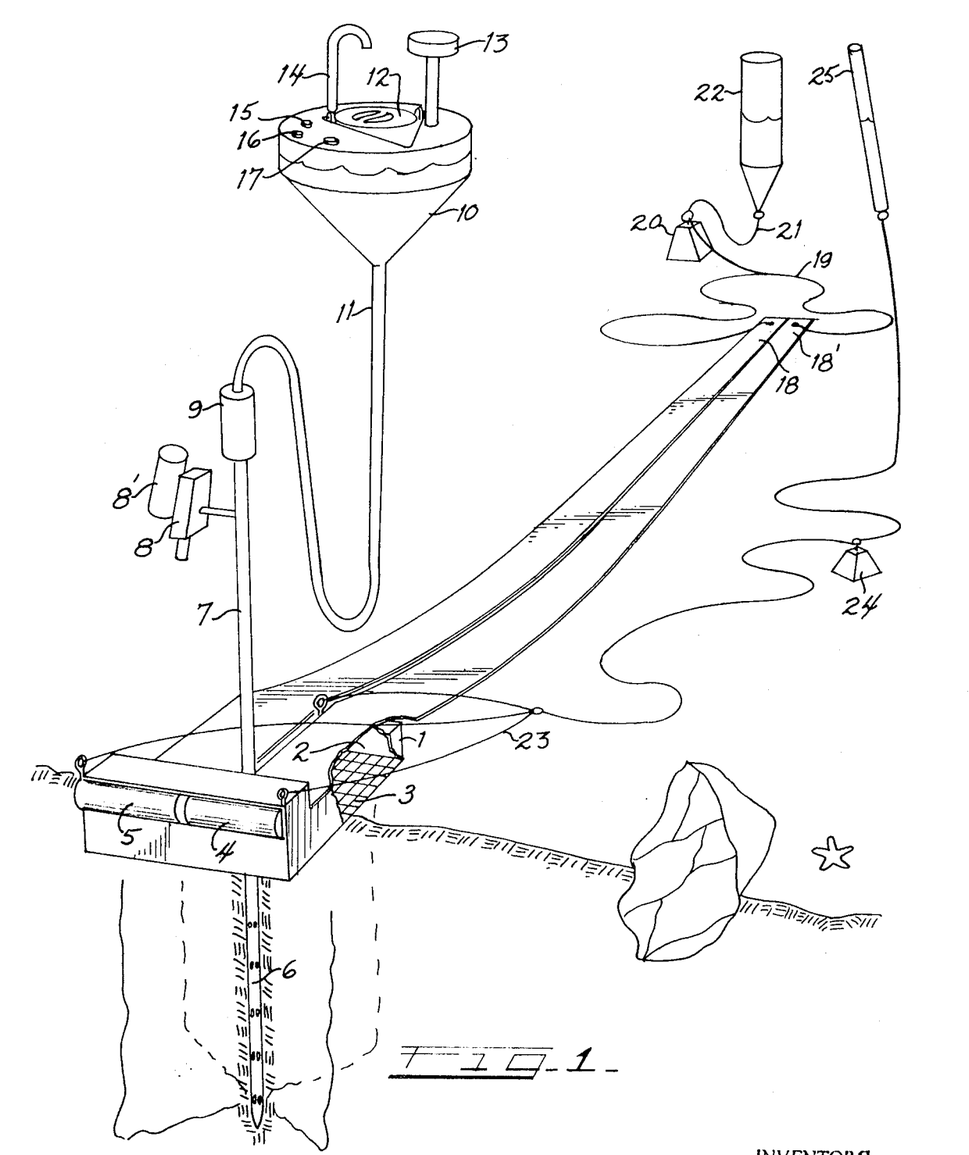
FIG. 1 is a perspective view, largely schematic, showing a system or apparatus for recovering minerals by electro-deposition from the bottom of the ocean.

Referring first to FIG. 1, there is illustrated schematically a system for collecting ore particles from the bottom of the ocean by electro-deposition which embodies a collecting apparatus adapted to be moved at intervals along the ocean floor. The apparatus comprises a box-like member 1 forming an ionization of electrolyte receiving chamber 2, the member 1 having insulated sides which enclose an electrolyte (not shown) comprising both reagents and products of reaction for dissolving the metallic compounds found on or underneath the ocean floor. The open bottom of the member 1 which is adapted to be positioned on the ocean floor is closed by a grid 3.

Rolls or coils of very thin metal sheets 4 and 5 which may be, for example, copper, stainless steel, or graphite coated stainless steel, are mounted at the top of one side of the chamber 2 so that they may be unrolled across the top of the chamber 2 and form cathodes for permanent deposition of ore fractions. As the portions of the coils 4 and 5 disposed over the electrolyte accumulate deposits, the free ends of the strips portions are pulled out unrolling the coils 4 and 5 and exposing fresh surfaces over the electrolyte chamber 2.

A probe 6 is employed with the chamber 2 which may be inserted into the deep ocean subfloor to the depth of the ore body, ballistically or by drilling and which serves to feed reagents into the subfloor. A tube member 7 forming a rifle barrel is used to guide the probe 6 in an attitude perpendicular to the ocean bottom and to provide a tower or supporting structure for mounting a television camera 8 and associated light 8'. A breech block 9 is provided on the upper end of the tower which carries a charge to fire the center probe 6 into the ocean bottom. The breech block 9 is connected to buoy 10 by umbilical cord 11 which contains electrical power lines, television cables, control and instrumentation cables, strain member, conduit for the reagents, etc. The umbilical cord 11 leads from the service buoy 10 which contains reagent supplies, power generators, direct reading and recording instruments, fuel supply, television monitor, etc. A manhole cover 12 permits access to and servicing of the equipment in the buoy 10. A generator air intake and ventilator 13 permits the intake of air but not of water and an exhaust pipe 14 is provided for the electrical generator. Bungs 15, 16, 17, etc., are provided for replenishing oil, fuel, reagents and dyes. A large number of similar buoys may be serviced by a single ship.

The free ends 18, 18' of the metal coils or strips 4 and 5 are attached by a harness 19 to an anchoring weight 20 which is in turn connected by cable 21 to a buoy 22 to mark the position of the coil ends 18, 18'. A harness 23 is attached to the box member 1 to enable the apparatus to be lowered and retrieved with an anchor 24 and spar buoy 25 which serve to establish and mark the end of the harness cable.

The bottom grid 3 is flexible or comprises fore and aft connected strips so as to accommodate irregularities in the ocean floor and is of a stable metal, for example, stainless steel, plastic reinforced carbon rods, plated copper, platinum or palladium, or of graphite, and forms one of the electrodes in the plating or electrolysis sub-system. The grid 3 constitutes an anode which is set at a polarity positive to that of the coils or strips 4 and 5 which constitute cathodes and both anodic and cathodic materials may be recovered. The anodic materials support the system chemically and the cathodic products are the metals which are recovered. Anodic materials and elements such as chlorine, bromine, iodine, etc. are used as chemical reagents to produce soluble metal salts and may also be recovered commercially. Cathodic materials and, elemental metals which are deposited as well as their salts, acids, bases, oxides and hydrides, due to chemical action at the cathodic surfaces constitute the useful output.

Figures 2, 2A, 2B:
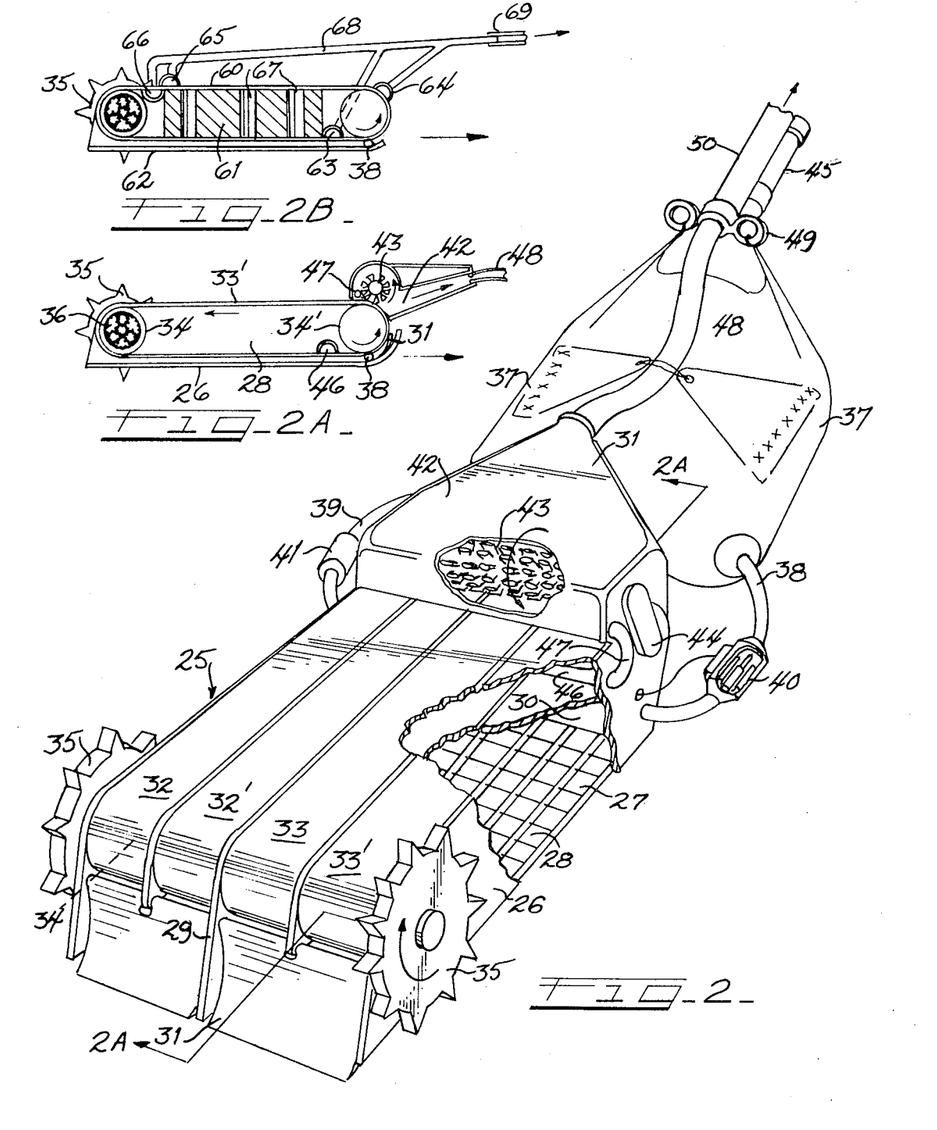
FIG. 2 is a perspective view of a system or apparatus for mineral recovery by electro-deposition from the ocean floor wherein the system is mobile.
FIG. 2A is a longitudinal section taken on the line 2a—2a of FIG. 2, to a smaller scale with parts shown schematically.
FIG. 2B is a longitudinal section similar to FIG. 2A showing a modified form of the apparatus.

A modified form of apparatus is shown in FIG. 2 which incorporates a collecting unit adapted to be towed so that it is dragged along the ocean floor. The collecting unit 25 comprises a box-like frame 26 having an open bottom in which there is a grid 27. The box is divided into two connecting ionization or electrolyte chambers 28 by a longitudinal partition 29 in conjunction with front and rear hingedly mounted aprons 30 and 31 which help retain the electrolyte and reduce loss of the latter to the surrounding water. Two pairs of traveling belts 32, 32' and 33, 33' are supported on drums or rollers 34 and 34' (FIG. 2A) journaled at opposite ends of the frame 26 and the belt supporting rollers 34 at the trailing end of the frame are driven by toothed wheels or disc 35, the shafts of which are connected to the roller shafts by reversing or planetary gears, indicated at 36 in FIG. 2A. The teeth on the spur wheels 35 dig into the ocean floor as the frame 26 is advanced and the wheels are caused to rotate and drive the belts 32, 32' and 33, 33' so that the bottom runs thereof advance in the direction of advance of the frame 26.

The chambers 28 are supplied with reagents which are stored in pressure equalized bags 37 and fed to each chamber 28 via feeder lines 38 and 39 having control valves 40 and 41. The valves 40 and 41 automatically control the rate of reagent feed depending upon preselected ionization rate, pH or conductivity of the electrolyte. The chambers 28 contain insoluble ores, reagents, the products of reaction, gases and solutions as electrolytes (including fresh or sea water) in which are dissolved the normally insoluble mineral compounds which through chemical reaction or electrolysis become ions and hence are platable or separable.

The belts 32, 32' and 33, 33' which are of conducting plastic, conducting rubber, graphite or inhibtor-coated metal, pass through a collecting chamber 42 arranged at the forward end of the frame 26 and material deposited on the surfaces of the belts will be brushed off into the collecting chamber 42 by a brush 43 supported on a shaft journaled in the side walls of the chamber 42 and having a connecting drive, indicated at 44, with the shaft of the belt supporting rollers 34'. The brush 43 may also serve to add graphite which has been lost and to work it into the surfaces of the moving belts. Suction in the collecting chamber 42 is created by gas intrusion from the decomposition of water in the electrolysis unit 45, by gas injection from the surface (at shallow depths), by gases liberated at the cathode belts or frame such as hydrogen, by gases liberated at the anode belts or frame such as chlorine and/or oxygen, by suction pumps at the water surface, etc. The suction in the collecting chamber 42 will be applied to a narrow area the entire width of the belt chamber 28 by suction-scraper element 46 via pipes 47. A flexible hose 48 connects the collection chamber 42 to the saddle coupling 49 which connects to the conduit 50 running to the surface.

An alternate construction of the apparatus of FIG. 2 is shown in FIG. 2B. In this arrangement the belts 32, 32' and 33, 33' of the apparatus of FIG. 2 are replaced by an equal number of porous, non-conducting, continuous belts 60, which serve as filters to keep ore particles out and also as repositories for soluble and insoluble materials for recovery, and an equal number of cathodes 61 are disposed between the upper and lower runs of the belts 60 and spaced above the bottom anode grid structure 62. Soluble minerals (ions) while in the confines of the belts 60 react to form insoluble precipitates, some gain electrons to become elemnetal metals, some are displaced by cathodic ions to become elemental metals or they are "plated out" on the surfaces of the cathodes 61 to become elemental metals. The insoluble materials for recovery include the foregoing soluble materials made insoluble as described plus insoluble materials from previous actions. The belts 60 convey the soluble materials which have been made insoluble and the insoluble materials from previous actions forward to suction scraper elements 63 and 64 corresponding to element 46 of FIG. 2, which remove the same from the top and bottom sides of the lower run of the belt. Similar suction-scraper elements 65 and 66 are disposed at the opposite end of the unit for removing the materials from the belts after the latter have passed over the top side of the cathodes 61. The cathodes 61 are provided with a series of vertical passageways 67 so as to transmit soluble materials (ions) to the top side and permit maximum use of the cathode surfaces. Feeder pipes 68 connect the suction-scraper elements 63, 64, 65 and 66 with a common conduit 69 or if electro-segregation is employed each belt-cathode combination will have the suction-scraper elements which are operative thereon connected to separate conduits for collection of the particles. The anode grid 62 is made of passive material, for example, carbon, platinum or palladium, usually having a common reference potential of zero volts. The cathodes 61 are made of carbon, iron or stainless steel, though materials such as copper may be used where copper molecules will go into solution as copper ions to displace solution ions of more noble metals which will "plate out" to replace the ionized copper molecule. The unit is otherwise constructed as illustrated in FIGS. 2 and 2A.

Figure 3:
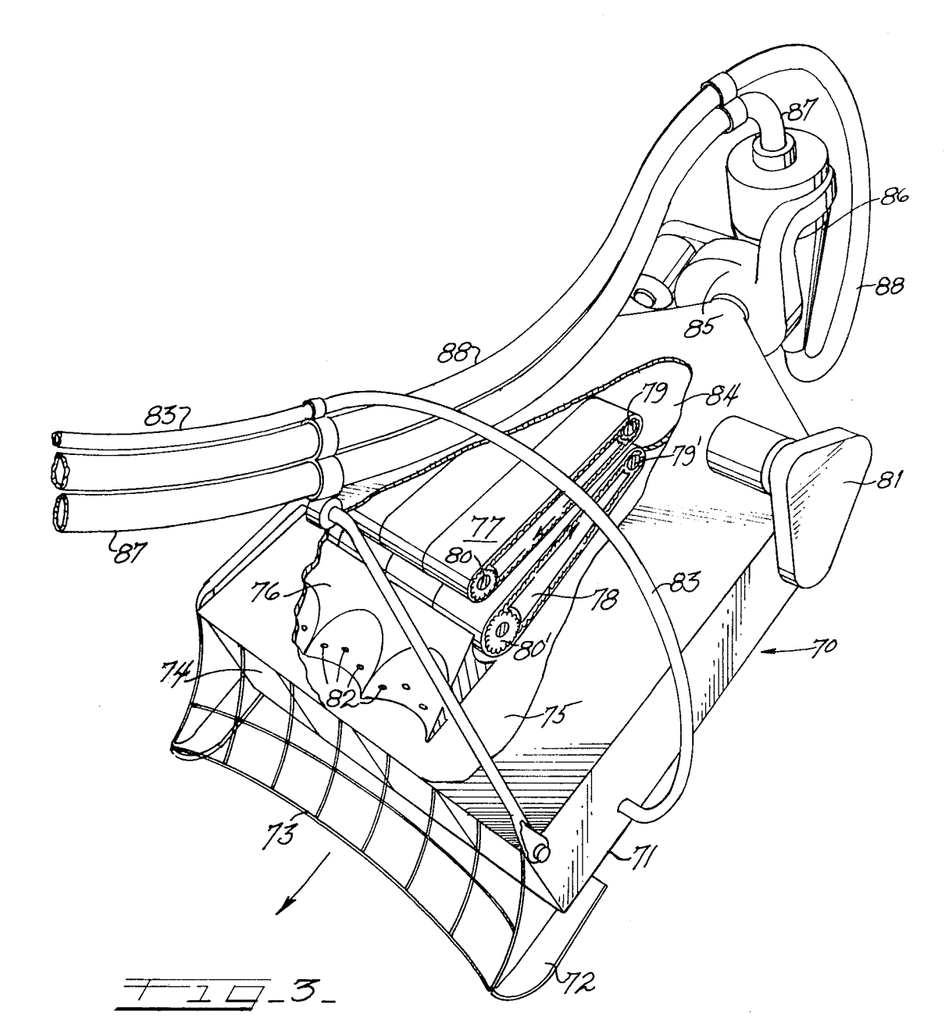
FIG. 3 is a perspective view of a mobile system for the recovery of minerals from the ocean floor by solution chemistry and employing electro-deposition at the surface.

A further modification of the system is illustrated in FIG. 3 where the functions of retrieval and electro-deposition are separated, that is, an ocean floor unit 70 is provided which prepares and retrieves the ore particles and dissolved minerals while separation of the valuable elements is accomplished later at the water's surface by the electro-segregation and electro-deposition units shown in FIGS. 4 to 10. Physical beneficiation, i.e. separation by metal types, is also accomplished in the surface units.

The retrieval unit 70 comprises a box-like housing forming frame 71, with an open bottom and runners 72, which is adapted to be pulled along the ocean floor like a sled. A wide mesh screen 73 at the forward end of the frame 71 will pass ore lying on the ocean floor to a hinged apron 74 and into a reagent or solvent mixing compartment or chamber 75. A scoop-like scraper 76 is mounted in the chamber 75 in front of a pair of crushing-grinding belts 77, 78 which are mounted on pairs of end rollers 79, 80 and 79', 80'. The belt supporting rollers are mounted on shafts journaled in the side walls of the frame 71 and are differentially driven by suitable drive connections with a motor reducer indicated at 81. Reagents are fed into the mixing chamber 75 through holes 82 in the scraper 76 and conduit 83 which leads to a surface supply source. The crushing-grinding belts 77, 78 empty into a collection chamber 84 at the rearward end of the frame 71 and the materials, which continue to react or dissolve in the presence of the reagents and/or solvents as they pass between the belts 77 and 78, are drawn into a motor driven suction pump 85 and then into a cyclone 86. The cyclone 86 separates the fine, dissolved, precipitated and free particles, solutes and entrained and chemically generated gases which flow upwards into umbilical cord-like conduit 87 to the surface. The larger particles and gangue which enter the down-flow of cyclone 86 may be discharged at the apex to the ocean floor or raised to the surface through conduit 88. When it is desired to recover large and small particles and solutes (with gases) one of the conduits can be eliminated. The conduit column will be light due to the liberation of gases by chemical reaction, which will consist largely of hydrogen, oxygen, nitrous oxide, carbon dioxide and chlorine in most operations. In the event the conduit column is not light enough, water decomposition, by electrolysis, surface suction pumps, air from the surface etc. may be used to lighten the same and to obtain the desired velocity of the material transported in the conduit.

In those situations where the product to be recovered is such that one or more chemical reactions are desirable or required before optimum solubility or ionization can be realized, the proper reagents are used sequentially, or in combination as complex solvent reagents, depending upon their stability when mixed or when they are jointly in contact with the ore. Inhibitors may also be required to prevent unwanted reactions and the use of suitable catalysts is contemplated to speed up ionization and improve electro-deposition rates. These reagents and/or solvents, inhibitors and catalysts may be applied at the bottom surface or under the ocean floor to the depth of the ore seam, with or without a persistant tracer which will identify depleted or mined areas so that they are not re-mined.

Figures 4, 5:
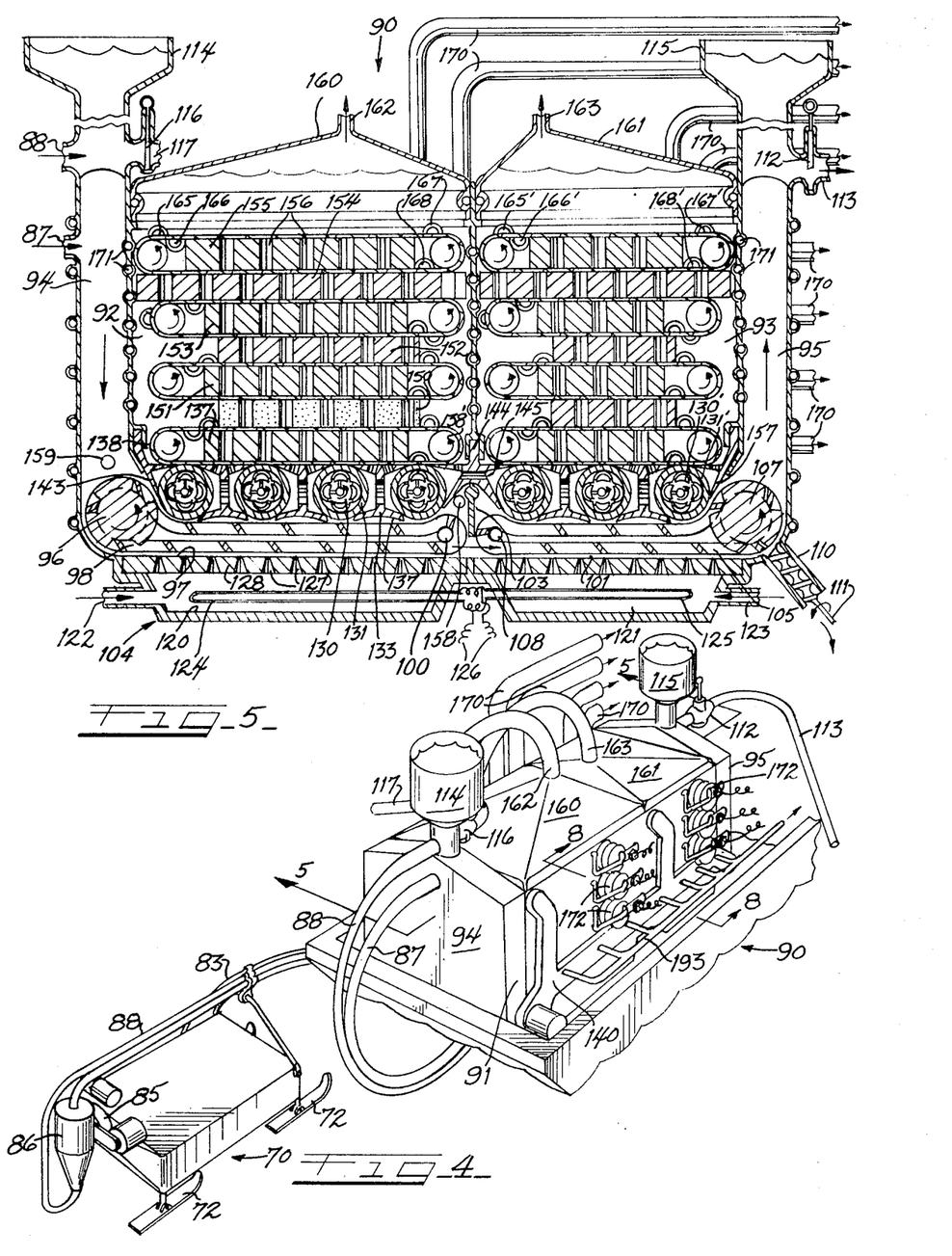
FIG. 4 is a perspective view showing the bottom of the ocean recovery unit of FIG. 3 connected to a surface unit employing solution chemistry, electro-deposition, and electro-segregation for the recovery of minerals.
FIG. 5 is a longitudinal cross section taken on the line 5—5 of FIG. 4, to an enlarged scale, and with portions broken away.

Referring to FIG. 4 of the drawings, an ocean floor recovery unit 70, which is constructed as illustrated in FIG. 3, is shown coupled to a surface unit 90, the unit 70 providing for chemical treatment, crushing and grinding of ore and the unit 90 providing for conversion of the material received from unit 70 into elemental metals, metal salts and bases, oxides, and hydrides by electro-deposition and electro-segregation of the metals into specific metals or groups of metals and their respective compounds.

Figure 6:
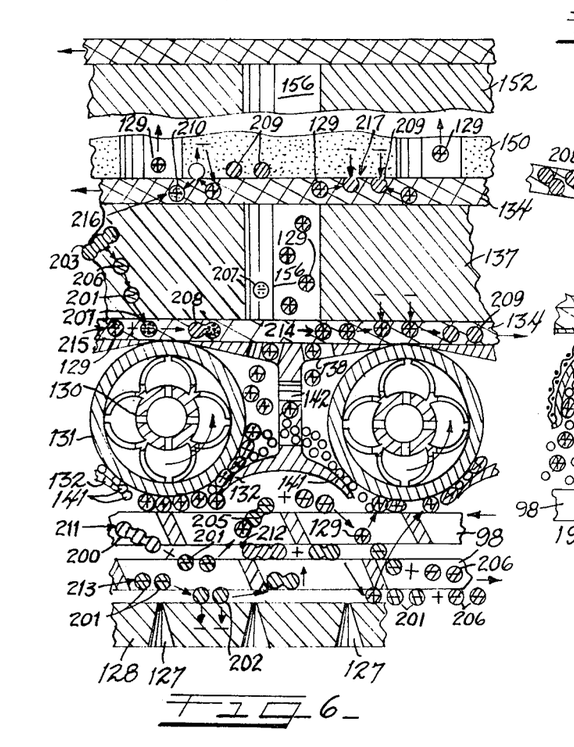
FIG. 6 is a fragmentary section showing a portion of FIG. 5 to a larger scale.

Referring particularly to FIGS. 5 and 6, the surface unit 90 comprises a generally rectangular tank-like housing 91 which is divided, as shown in FIG. 5, into two main chambers or compartments 92 and 93 and end chambers or compartments 94 and 95. The materials from the unit 70 enter the intake chamber 94 from either or both conduits 87 and 88 as shown in FIG. 5 and continue down into chamber 94 to sprocket member 96 at the bottom of the chamber 94 which opens into sub-chamber 97 in the bottom portion of the left (as viewed in FIG. 5) main chamber 92. The sprocket member 96 is motor driven and forms an end support for an open meshed plastic belt 98. The belt 98 extends horizontally in the sub-chamber 97 to an end support roller 100 and serves to transport heavy mass materials by movement of the bottom run to the right in FIG. 5 while movement of the top run stirs liquids and fines to the left. The net movement of the heavy input materials will be from the left anode sub-chamber 97 to the right anode sub-chamber 101 through the opening 102 between a hinged gate 103 and the base or bottom structure 104 to the sub-chamber 101 in the bottom portion of or below the right main chamber 93. An open meshed plastic belt 105 of the same character as belt 98 is supported in the horizontal sub-chamber 101 on motor driven sprocket roller 107 and co-operating end roller 108, the former positioned at the bottom of the end chamber 95 and the latter positioned adjacent the opening 102 and gate 103. The belt 105 is driven in the same direction as belt 98, the bottom run transporting heavy material to the right while the top run stirs liquids and fines to the left. The heavy materials, such as sand, shells and solid gangue, is discharged as waste at the bottom of the end chamber 95 through a discharge pipe 110 by a driven screw 111, which may be of plastic or rubber composition. The fines and liquids rise in the chamber 95 and pass through valve 112 to outlet conduit 113. The conduit 113 may discharge these materials as waste or the reagents therein may be recovered, by concentration, and recycled so as to be used again. Where desired the materials may be neutralized before disposal so as to avoid water pollution.

The flow of the ore and other materials recovered by the recovery unit 70 and delivered to the iron-ore separation unit 90 is through chambers or passageways providing a path or configuration resembling a U-tube. To provide for positive pressure on the materials entering the unit 90 reservoir 114 is provided at the top end of the chamber 94 which constitutes the upstream riser and reservoir 115 is provided at the top end of the chamber 95 which constitutes the downstream riser. The reservoirs 114 and 115 compensate for surge and cause little change in head which makes for efficient operation. A valve 116 and outlet conduit 117 are provided opposite the inlet conduit 88 for use in cleaning the system or removing obstructions, enabling clean water to be forced into the inlet from conduit 88 and through the outlet 77 to draw solids and liquids from the end chamber 94. Also, samples for essay purposes may be obtained in this manner to determine whether the large particles in the down-flow of the cycle 86 are to be accepted into the unit 90 or rejected.

Since the materials delivered to the ion-ore separation unit 90 have a relatively high percentage of solids, water receiving and heating chambers or headers 120 and 121 are provided in the bottom structure 104 of the unit below each of the sub-chambers 97 and 105 with inlets 122 and 123 for sea, river or lake water. Suitable electrical heating elements 124 and 125 are provided in the chambers 120 and 121 with current supplied through terminals indicated at 126. The heated water passes through tapered holes 127 in the anode member 128, which separates the sub-chamber 97 from the heating chamber 120, and into the left anode chamber where, together with anodic gases and other products formed, it will mix with the input ore, reacting with the ore, ore derivatives and reagents carried up from the ocean bottom unit 70. Soluble positive ions, which are indicated by numeral 129 in FIG. 6, and which are formed by chemical reaction in the units 90 and 97 pass upwardly in the sub-chamber 97 through the mesh belt 98 and are attracted by cathodes 130 until stopped by unglazed clay tubes 131 which enclose the cathodes 130. The clay tubes 131, which are preferably fabricated of flower pot grade (red) clay, and which serve as barriers, permit the passage of electrons and small positive ions, such as hydrogen, but prevent the passage of large positive ions, such as copper. The principal function of the clay tubes 131 is to separate the positive metal ions from their ore and gangue environment. The positive metal ions will adhere to the surfaces of the tubes 131 which are rotated and carry the ions around and upwards between the tube surfaces and the flexible lower flanges 132, preferably formed of nylon, on the I beams 133 which are disposed in parallel spaced relation between the clay tubes 130. The rotation of the tubes 130 will drive the metal ions upwardly between the I beams 133 into the interspaces of non-conducting fiber or cloth conveyor belt 134 to a second cathode forming member 137 which is disposed between lower and upper runs of the belt 134, the latter being mounted on end support rollers 138 and 138' having their shafts journaled in the side walls of the housing 91 and driven by connection with a common drive mechanism for the apparatus, which is indicated at 140 in FIG. 4. Some fine ore and gangue (141 in FIG. 6) will be carried around and up between the clay tubes 130 and the bottom flanges 132 of the I beams 133 but these comprise particles which are electrically neutral and they do not move up, except by chance or convection current, and generally will pass through holes 142 in the I beam webs and will be carried down and into the subchamber 97 again by the downward rotation of the clay tubes 130 as illustrated in FIG. 6. The electrically neutral ore and gangue particles serve to force the lips of the flexible bottom flanges 132 of the I beams 133 away from the surfaces of the tubes 130, as they move down between the same, causing openings upward for migration of the ions. The top and bottom flanges of the I beams 133 are of nylon plastic or other resilient material having good insulation and wear characteristics and are proportioned so as to be spread apart during assembly with resultant continuous pressure on the tubes 130 by the I beam flanges 132. Extrusions of nylon or similar resilient material 143 and 144 at opposite ends of the sub-chamber 97 complete the separating structure between the cathode compartment or chamber 92 and the anode compartment or sub-chamber 97. The member 144 between the left and right hand anode sub-chambers 97 and 101 has holes 145 for the passage of ions and/or gangue from the left to right hand chamber. Additional traveling belts 146, 147, 148 separated by a series of cathode forming members 150, 151, 152, 153, 154, 155 are arranged in vertically stacked or pile forming relation above the lowermost belt 134 and the associated cathode member 137, the belts being of the same character, and supported and driven in the same manner, as belt 134 and the cathode forming members being arranged between the belt runs, as shown in FIG. 5, and having vertical passageways 156 for passage of the metal ions upwardly in the cathode chamber. A like arrangement is provided in the right hand anode chamber or sub-chamber 101 and in the cathode chamber 93 above the same. The end extrusion 157, at the exit end of sub-chamber 101, (FIG. 5) is provided with holes for passage of material from the sub-chamber 101 to the vertical end chamber 95. A vent 158 in the sub-chamber 97 traps and collects anodic gases and discharges them to outlet 159.

The cathodes are made of graphite unless it is desired to use cathodic metal to displace metals from the solution which are lower on the hydrogen activities series (more noble) than the cathode metal used. In the apparatus as illustrated in FIG. 5, the uppermost cathodes in the pile, the left chamber 92, indicated at 151, 152, 153, 154 and 155, are made of graphite while cathode 150 is made of metal for extraction by displacement. The left and right cathode chambers 92 and 93 are fabricated of strong material, such as fiber glass and epoxy resin, which is an insulator, and extend above the level of the highest cathode members with cover members or lids 160 and 161 each sealed with O-ring gaskets so that the water level can extend above the seal. Vents 162 and 163 are provided to bleed off gases such as hydgrogen, chlorine and oxygen formed in the process.

Figure 7:
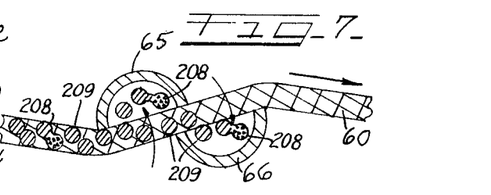
FIG. 7 is a fragmentary cross section showing a portion of FIG. 2B to a larger scale.

The materials collected on the traveling belts 134, etc. are removed by suction-scraper units, indicated at 165, 166, 167 and 168 in FIG. 5, which are the same character as units 65 and 66 of FIGS. 2 and 7 and draw off the materials trapped on the belt surfaces in the same manner. The suction-scraper units 165 etc. have connections with suction pipes or conduits 170 which convey water and insoluble metal compounds and elemental metals to settling tanks for collection and refining. The number of electrodes and the number of separate pipes 170 which are employed will determine the degree of separation of the materials into their respective metal groups. Since ion travel is slow, a magnetic field is created by electrical coils, indicated at 171, which are incorporated in the wall structures or wrapped around the electrolytic tanks 92, 93, 94 and 95 in horizontal, helix fashion and fed current through suitable connecting means from a supply line. The coils create strong magnetic fields having vertical lines of force which speed up the movement of the ions. In the design of the apparatus the distances through which the ions must travel may be held to a minimum. For example, the distance from the anodes 128 to the clay barrier tubes may be as little as 5 mm., the barrier tubes may be as little as 2 cm. in diameter and the belts 134, etc. can be as little as ½ mm. thick. The cathodes can be kept thin so that positive ions migrating through the holes 156 will travel minimum distances.

Freedom of movement of the unit 90 is necessary and good electrical contact must be maintained. Therefore, special electrical connectors 172 (FIGS. 4, 8 and 8A) are provided for the anode and cathode members, which are mounted on the outside walls of the electrolyte tanks.

Figure 8:
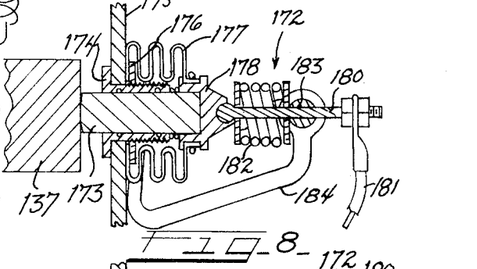
FIGS. 8 and 8A are fragmentary sections showing electrical contact details.
Figure 8A:
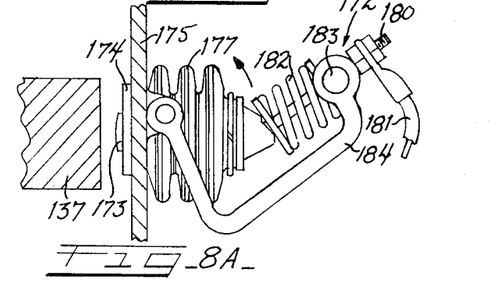

As shown in FIGS. 8 and 8A, a graphite plug 173 is slidably mounted in bushing 174 set in the tank wall 175 with O-rings to affect sealing. The bushing 174 is secured by nut 176 which also secures the chamber end of a dust bellows 177. The outer end of the bellows 177 is secured to a socket joint member 178 on the outer end of the plug 173 which serves as the electrical contact for a connecting rod and terminal member 180, which is in turn connected to the electrical cable 181. Engagement of the plug 173 against the end wall of the cathode member, 137 for example, is maintained by a spring 182 which operates between the ball and pin 183 to provide in co-operation with hinged bracket member 184, an overcenter lock, for holding the connector in the contact-making position of FIG. 8 or the non-contact position of FIG. 8A.

Figure 9:
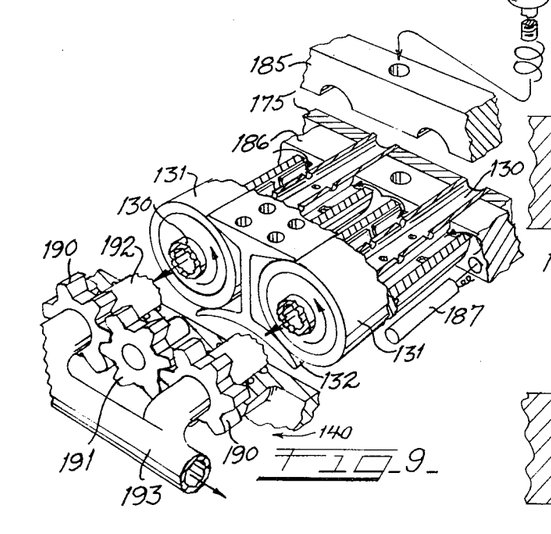
FIG. 9 is an exploded perspective with portions cut away showing an ore-ion separation unit.

Referring to FIG. 9, electrical contact is made with cathode member 130 by means of graphite pillow blocks 185 and 186, which are spring mounted, with the base pillow block 186 having outside electrical contact through graphite pin 187 pressed into pillow member 186 and fixedly mounted through wall 175.

As shown in FIG. 9, the drive for rotating the cathode forming members 130 comprises pinions 190 which are caused to rotate in the same direction by idlers 191. The pinions 190 may be connected to the clay barrier tubes 131 only or to both the tubes 131 and the cathodes 130. The pinions 190 form part of the drive mechanism 140 (FIG. 4). When the cathodes 130 are rotated they are designed in cross-section like a four leaf clover so that the voltage influence upon positive ions will be very slowly a pulsating one. When the cathodes 130 are not rotated the voltage can be "rotated" by commutation. The cathodes 130 are hollow and one end is open for receiving sea water which is distributed through openings to the chambers formed between the cathodes and the clay pipes where sodium will react with the water to form sodium hydroxide and the resulting mixture will pass through tubes 192 and connecting manifold tube 193.

Figure 10:
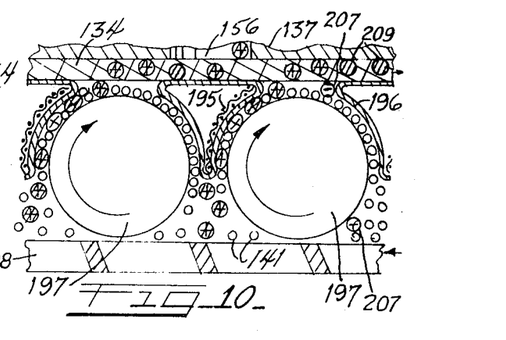
FIG. 10 is a fragmentary section showing a modification of the ore-ion separation unit of FIG. 9.

A modification of the ion-ore separation unit is shown in FIG. 10 in which there are fixed or stationary cathodes 195 in clay wedges 196 between the rotating drums 197, the latter being insulators or conductors, for example, conducting rubber, with the potential, when conductors, being more positive than the fixed cathodes 195.

In using the apparatus the cathodes 130 at the bottom of the stack or pile in the cathode chamber 92 would be set at a potential, for example, 10 to 20 volts more negative than the anodes 128. The cathode 137 which is the next higher in the pile would be set at 2 to 4 volts more negative than the cathode 130 and the next cathode would be set at 3 to 6 volts more negative than cathode 137. A typical arrangement would be to provide voltages of 0, −20, −24, −29, −35 and −42 for the anode 128 and the first to the fifth cathodes 130, 137, 150, 151, 152, respectively. The right cathode chamber is set up in the same manner. This arrangement is made in view of the known characteristics of metals and their compounds, base metals requiring relatively little inducement to go into solution as ions and the noble metals exhibiting much greater reluctance to go into solution from their elemental state or from insoluble compound state and requiring higher voltage and/or oxidizing chemical reactions to convert the metal atoms or molecules into (soluble) metal ions. Consequently, the low voltage electrodes will reduce the more noble metal ions to their elemental state and the higher voltage electrodes will reduce the base metal ions to their elemental state. With the arrangement referred to, positive ions will migrate upwards from the cathode chamber and through the cathode pile. The first cathode 130 is employed to separate the ions from the ore and gangue and not for deposit on positive ions. The second cathode 137 will take the most noble metals out of solution, converting ions to atoms or molecules, such as, to oxides or hydroxides, the third cathode will take out the less noble metals and so forth until the last cathode will deposit on the associated belt the base metals, such as zinc, aluminum, magnesium, etc., which will react with $Na^+$ $OH^-$ to form hydroxides.

The various components involved in a typical operation are illustrated schematically in FIGS. 6, 7 and 10. Insoluble metal compounds are indicated at 200. Reactive negative ions resulting from chemical and electrolytic action are indicated at 201. Anodically oxidizing reactive negative ions are indicated at 202 and anodically oxidized molecules at 203. Soluble positive metal ions sought are indicated at 129. Nascent, dissolving, metal compounds are indicated at 205. Negative metal ions displaced from insoluble metal compounds 200 are indicated at 206. Also, reactive negative ions resulting from electrolytic and chemical actions are indicated at 207. Insoluble metal compounds produced by reaction of 129 and 207 are indicated at 208. Insoluble ore and gangue particles are indicated at 141. The cathode 150 is fabricated of a displaceable metal which is ionized into cathode atoms indicated by 210. Typical actions and reactions are: the reacting of insoluble metal compounds 200 with reactive negative ions 201 to form soluble positive metal ions 129 which are sought, as indicated at 211; the reacting of insoluble metal compounds 200 with reactive anodically oxidized molecules 203 to form soluble positive metal ions 129 as indicated at 212; reactive negative ions 201 oxidizing (loss of electrons) to form anodically oxidized atoms 202 which combine to form anodically oxidized molecules 203, as indicated at 213; soluble positive metal ions 129 reduced (gain electrons) to elemental atoms or molecules 209, as indicated at 214; soluble positive metal ions 129 reacting with reactive negative ions 201, 206, 207 to form insoluble metal compounds 208, as indicated at 215; insoluble cathode metal atoms from cathode 150 displacing soluble metal ions 129 from solution, the atoms from 150, shown as 210, oxidizing to soluble ions by giving up electrons to positive metal ions 129 and the latter being reduced to elemental metal atoms or molecules 209, i.e. are "plated out" as indicated at 216; and soluble positive ions 129 reducing (gaining electrons) to elemental metal molecules or atoms 209, i.e. are "plated out" as indicated at 217.

Oxidation occurs at the anodes and reduction occurs at the cathodes. Free negative ions are reduced to chlorine, oxygen, nitrous oxide, sulphur dioxide, carbon dioxide, etc., many of which result from the action of reagents on insoluble sea bottom ore. Many of these will react with insoluble metal compounds and form a few insoluble ores with certain metals, notably silver and mercury. Two cathode chambers are employed in the apparatus so that conditions are made most favorable for two main groups of metals.

Most metal chlorates are soluble in water. Metal benzoates, metal nitrates and metal sulphates generally, are soluble in water. Metal chlorides, except for silver, mercury and chromium are soluble in water. Metal bromides of the metals desired are soluble in water. Only an insignificant number of metal oxides are soluble in water. The most interesting metal carbonates, with the exception of chromium, and the most interesting metal hydroxides, with the exception of auric hydroxide are insoluble in water. Metal silicates generally and metal iodides with the exception of nickel, tin and zinc are insoluble in water. In the illustrated apparatus the left chamber 92 is designed to first dissolve (or receive dissolved) and then precipitate by electro-deposition and its concomitant chemical reduction all metals, but very little silver and mercury. The right chamber 93, when supplied with fresh water and small amounts of sodium hydroxide and ammonia as conveyor fluid is designed to extract silver and mercury and their compounds, most other metals having been removed in the left chamber 92. Fresh water and ammonium hydroxide enters the header 121 via pipe 123 and rises to the first cathode through the right anode chamber 101 (FIGS. 5 and 9) in the right chamber 93 and with dissolved sodium hydroxide from both left and right chambers proceeds upwardly through the ion-ore separation units 130', 131' etc. into the cathode stack. The leeched gangue is returned to the right anode chamber 101 and the positive metal ions and liquids continue upwardly through the cathode stack where the elemental metals, indicated at 209 in FIGS. 6 and 7, and metal compounds 208 are removed from the belts by suction-scraper units 165', 166', 167', 168' and carried with entrained fluids through conduits 170. The negative voltages increase from cathode to cathode as in the left cathode chamber 92 so that the more noble metals plate out at the lower cathodes and the more base metals plate out at the upper cathodes resulting in electro-segregation by metal types.

Tests have shown efficient extraction of all metals except the alkali and alkaline earth groups. Employing the instant process the apparatus collects the ores, converts insoluble ore to soluble metal ions and reduces these ions to their elemental or simple compound forms, segregating them by metal type groupings ready for refining into metal billets or products. A large part of the metal yield comes about through the chemical reduction of the metal ions. A large part of the yield results in insoluble metal oxides and hydroxides formed at the cathode surfaces due to the generation of reactive alkali metal hydroxides at these surfaces. The hydroxide reaction at the cathodes results in all metals below magnesium in the hydrogen activities series forming insoluble hydroxides (or insoluble oxides). All other metal ions 129 react with the hydroxide ions 207 of sodium hydroxide say, to form insoluble hydroxides or oxides, designated 208 in FIG. 6. The same type reaction occurs with sodium carbonate and certain silicates, iodides etc. which are soluble in the cathode chambers and react with metal ions to make them insoluble. Correspondingly, to convert insoluble metal ores into soluble ions requires that these ores be converted to chlorates, bromides, some iodides, benzoates, nitrates, sulphates or most chlorides, which is accomplished in the sea bottom unit and/or in the anode chambers of the surface units, with some reactions occurring in the ion-ore unit.

Silver forms a special case as the carbonate and chloride are relatively insoluble in water. Addition of ammonium hydroxide into the head 121 with fresh water, rather than salt water, permits them to become soluble since high chlorine ion content in the fluid forces silver ions out of solution. Reaction of the silver ion in the cathode chamber is then identical to that for other metals.

A reaction also occurring at the cathode results from the effect of abundant nascent and molecular hydrogen which reduces some metal compounds to their elemental metals and reacts with some metals and compounds to form transient hydrides which are in the form of gas or solids which readily decompose. This effect is not harmful and aids in providing more elemental metals 209 from compounds 208. Both elemental and nascent hydrogen will reduce some metal ions 129 to elemental metals 209, both with, and independently of, the other reactions already cited. Because of high adsorbtion of hydrogen by platinum and palladium, their use as cathode material is particularly applicable to catalyze these reactions.

Tests with apparatus having cathodes that are free of electrical connections, except the first, 130, the second 137 optionally and the last cathode 155 have shown good metal and metal compound recovery. The voltage of these floating cathodes is then established by their position in the voltage drop gradient through the electrolyte between the connected cathodes controlled in addition by the reduction activity at each floating cathode surface so as to be self-regulating with regard to zone positive ion concentrations in the electrolyte.

Tests also indicate the highest metal and metal compound recovery results when employing low anode efficiency (high gas formation at the anodes) and high cathode efficiency (low gas formation at the cathodes).

What is claimed is:

1. An apparatus for use in mining metal bearing materials from ore beds in water filled areas which comprises a frame having the form of a box with the top and sides closed and the bottom face thereof open so as to provide a downwardly facing enclosure constituting a reaction chamber which chamber is adapted to receive materials for reacting with the ore materials, conduit means connected with said reaction chamber for supplying the chamber with materials which will react with the ore materials so as to release metal particles or compounds therein for separation from waste forming portions of the ore materials upon the positioning of said frame with said open bottom face on said ore bed, said frame having means forming electrodes arranged in vertical stacked relation, one of which is disposed in said bottom face in the form of a grid, means for supplying current to the electrodes, means for supplying to said chamber an electrolyte for cooperation with said electrodes so as to cause electrodeposition of desired metals, and means mounted on said frame for collecting the metal particles and the desired metal compounds for transfer to the surface.

2. An apparatus as set forth in clainm 1 wherein said one of the electrodes which is disposed in said bottom face in the form of a grid constitutes a bottom closure for said reaction chamber.

3. An apparatus as set forth in claim 1 wherein one of said electrodes is a relatively thin strip of electrode forming material which is movably mounted on said frame so that minerals deposited thereon by electrolysis may be transported to a collecting area for removal from said strip.

4. An apparatus as set forth in claim 1 wherein one of the electrode means is in the form of a roll of relatively thin strip material which is mounted on said frame so that it may be unrolled to provide additional surface for deposit of material by electrolysis.

5. An apparatus as set forth in claim 1 wherein said reaction chamber has an electrode member in the form of a relatively thin elongate strip movably mounted in the top of said frame and disposed over the top face of said reaction chamber which may be extended to provide additional surface for deposit of material thereon.

6. An apparatus for use in mining metal bearing materials from ore beds in water filled areas which comprises a frame adapted to be positioned on the top surface of an ore bed, said frame having a reaction chamber, said reaction chamber having an open bottom, said reaction chamber being adapted to receive materials for reacting with the ore materials, means for supplying said reaction chamber with materials which will react with the ore materials so as to release metal particles or compounds therein for separation from waste forming portions of the ore materials when said frame is positioned with the open bottom on said ore bed, an electrode member closing the open bottom of said reaction chamber, said reaction chamber having an opening in the top thereof, an electrode forming endless belt mounted in the top opening of said reaction chamber, means to supply an electrolyte to said chamber, suction-scraper means operative on said belt electrode to remove therefrom metal particles and compounds deposited on the surfaces thereof and means associated with said frame for collecting the metal particles and the desired metal compounds for transfer to the surface.

7. An apparatus as set forth in claim 6 wherein said endless belt is mounted on a cross shaft and means is provided to drive said endless belt including wheel forming discs mounted on said frame and rotated by contact with the ore bed when said frame is dragged along the ore bed.

8. An apparatus as set forth in claim 6 wherein said frame includes means forming a collection chamber at one end thereof, said endless belt has a portion of its path extending through said collection chamber, and means is provided in said collection chamber which is independent of said suction scraper means for removing deposits from the belt surface.

9. An apparatus as set forth in claim 8 wherein said means for removing deposits from the belt surface comprises a brush rotatably mounted in said collection chamber and wherein suction means independent of said suction scraper means is provided to transport material from the collection chamber to the surface.

10. An apparatus for use in mining metal bearing materials from ore beds in water filled areas which comprises a frame having a reaction chamber with a bottom opening, which chamber is adapted to receive materials for reacting with the ore materials, means for supplying the chamber with materials which will react with the ore materials so as to release metal particles or compounds therein for separation from waste forming portions of the ore materials when said frame is positioned with the open bottom on said ore bed, an electrode-forming grid in said bottom opening, an endless traveling belt mounted in said frame on end support members, an electrode forming member disposed between upper and lower runs of said traveling belt and spaced above said grid, means for supplying an electrolyte to said chamber for co-operation with said electrodes to effect deposition of metal bearing materials on said traveling belt, means associated with said traveling belt for removing metal bearing materials trapped on said belt and means associated with said frame for collecting the metal particles and the desired metal compounds for transfer to the surface.

11. An apparatus as set forth in claim 10 wherein the means for removing the metal bearing materials trapped on said endless belt comprises suction-scraper members engaging the surfaces of said endless belt, and means connected to said suction-scraper members for applying suction to said members for collecting said materials.

12. Apparatus for collecting ore from ore beds beneath the ocean or similar bodies of water which comprises a frame in the form of a sled and having a reaction chamber with an open bottom face adapted to be moved along the ocean floor so as to be disposed over a portion of the ore bed, means for feeding solvent and reagent materials to said reaction chamber which are adapted to act on the material in the portion of the ore bed which is exposed to the open bottom face so as to release the minerals and to form soluble compounds thereof, means on said frame for gathering material from the ore bed having mineral particles and mineral compounds, means for separating the minerals and the compounds thereof from waste-forming material gathered from the ore bed, means on said frame for effecting electrodeposition of the minerals, and means for removing the deposited minerals therefrom.

13. Apparatus for collecting ore from ore beds beneath the ocean or similar bodies of water which comprises a frame in the form of a sled and having a reaction chamber with an open bottom adapted to be positioned on and moved along the ocean floor so as to be disposed over a portion of the ore bed, means for feeding solvent and reagent materials to said reaction chamber which are adapted to act on the material in the portion of the ore bed which is exposed to the open bottom of said reaction chamber so as to release the minerals and to form soluble compounds thereof, means on said frame for gathering material from the ore bed having mineral particles and mineral compounds, said means for gathering the material including a pair of ore crushing belts mounted in said frame, drive means for said ore crushing belts, a member in the form of a scoop at the forward end of said pair of ore crushing belts for directing material between the crushing belts, said frame including a collecting chamber at the rear end thereof into which the material advanced by said ore crushing belts is discharged, means for separating the minerals and the compounds thereof from waste-forming material gathered from the ore bed, and means for effecting electro deposition of the minerals.

14. Apparatus as set forth in claim 13 wherein a conduit connected to said collecting chamber for transporting material discharged into said collecting chamber to the surface, and a suction pump connected to said collecting chamber and discharging into said conduit.

15. Apparatus as set forth in claim 13 wherein means including a conduit is provided for transporting material from said collecting chamber to the surface, a suction pump is associated with said conduit and a cyclone separator connects said pump and said conduit for separating light and heavy materials for transport to the surface through said conduit.

16. Apparatus as set forth in claim 13 wherein a conduit is connected to said scoop forming member has fluid discharge apertures communicating with passageways leading to said conduit and means for supplying solvent and reagent materials through said conduit for discharge from said apertures.

17. Apparatus as set forth in claim 12 wherein the means for effecting electrodeposition of the minerals comprises a fluid-accommodating chamber, an anode-forming electrode and a plurality of cathode-forming electrodes mounted in vertically spaced relation in said chamber, and including means for supplying said chamber with an electrolyte, and means for supplying current to said electrodes, said current supply means providing the individual cathodes with different voltages so as to cause different metals to be deposited at the different cathodes and thereby simultaneously collect and segregate separate metals which are present in the ore bed.

18. Apparatus for mining metal bearing ore materials in below water locations which apparatus comprises a frame in the form of a box defining the periphery of a chamber with an open bottom face which chamber is adapted for receiving materials which will react with metals or with insoluble compounds thereof to form soluble metal compounds when said frame is positioned with the open bottom face encompassing an area in which the ore materials to be mined are located, means connected with said frame for feeding to said chamber solvents and reagents which will react with the metals or the compounds thereof in the area below said frame, electrode forming means disposed in said frame so as to form a plurality of anode and cathode members, means for supplying an electrolyte to said chamber for cooperation with said electrodes means for supplying current of different voltages to certain of said electrodes whereby to effect electrodeposition of separate metals at different electrodes and means for removing the deposited metals.

19. Apparatus as set forth in claim 18 wherein certain of said electrodes are arranged in spaced relation laterally of each other.

20. Apparatus as set forth in claim 19 wherein certain of said electrodes are in the form of rolled strips which are mounted so that they may be unrolled to provide additional surface areas for deposit of metals thereon.

21. Apparatus as set forth in claim 18 wherein certain of said electrodes have traveling belts associated therewith so that metal particles and compounds thereof which are attracted by the electrodes will be deposited on the surfaces of said belts.

22. Apparatus as set forth in claim 21, wherein means is associated with each of said belts for removing the materials deposited thereon by action of the associated electrodes.

23. Apparatus as set forth in claim 18 wherein certain of said electrodes are arranged in the form of a vertical stack and means is provided for supplying current to selected electrodes at different voltages so as to provide for electrodeposition of metals according to types.

24. In an apparatus for recovery and separation of minerals from water charged ore, a chamber-forming housing having inner and outer wall portions spaced so as to form a generally U-shaped outer passageway extending along opposite ends and the bottom of the housing with vertical riser forming portions at oppositely disposed ends of the housing enabling ore mixed with waste and water to be fed into the down flow riser portion of said passageway and an outlet adjacent the top at the opposite end of the housing for discharging fluid materials and suspended waste particles from the up flow riser portion of said passageway, means in the U-shaped passageway for separating out heavy waste material and discharging the same from the housing, the bottom connecting portion of said passageway constituting an anode chamber and an electrode forming an anode in said chamber, a plurality of electrodes forming cathodes arranged in vertically stacked relation in the chamber above said anode chamber and spaced above said anode, means for supplying an electrolyte solution to said anode chamber so as to mix with the ore bearing liquid and rise into the cathode chamber above the same, and means to supply electric current to the electrodes so as to reduce the minerals to particle form and permit separation thereof.

25. In an apparatus as recited in claim 24 wherein said housing has a fluid-receiving chamber below said anode chamber and means for heating fluid supplied to said fluid-receiving chamber.

26. In an apparatus as recited in claim 24 wherein said cathodes have associated traveling belts extending along the top and bottom faces thereof on the surfaces of which metal particles attracted to the cathodes are deposited, and means for collecting the metal particles from the belt surfaces.

27. In an apparatus as recited in claim 24 wherein at least one of said cathodes is of metal so as to effect extraction by displacement.

28. In an apparatus as set forth in claim 24 wherein there is provided in said passageway a means for advancing the ore mixture in said passageway which comprises an endless traveling belt disposed in the bottom portion of the passageway which belt is of open mesh form so as to advance the heavier solid particles while permitting liquids and fine particles to pass through the belt and rise into the anode chamber above the same.

29. In an apparatus as set forth in claim 24 wherein reservoirs are disposed at the top of the downflow and upflow riser portions of said U-shaped passageway which compensate for surge in the inflow of the ore mixture.

30. In an apparatus as set forth in claim 24 wherein said downflow riser of said U-shaped passageway has a valve-controlled clean water inlet connection opposite the ore inlet connection to enable the housing to be cleaned.

31. In an apparatus as set forth in claim 24 wherein certain of said electrodes forming cathodes are disposed in the bottom of said cathode chamber and enclosed in rotatably mounted barrier-forming clay tubes, and wherein means is associated with the clay tubes for directing positive metal ions upwardly into the upper portion of the cathode chamber and permitting fine waste particles to be carried back into the anode chamber below the same.

32. In an apparatus as set forth in claim 24 wherein the chamber formed in said housing is subdivided to provide at least two chambers for mounting electrodes therein, a separate anode-forming electrode is disposed in an anode chamber at the bottom of each of said subdivided chambers, a plurality of cathode-forming electrodes are arranged in stacked relation in each of said subdivided chambers and means is provided to supply electric current to the electrodes so as to provide selected electrodes with different voltages for the deposit of different metals, and means for collecting the different metal deposits.

33. In an apparatus as set forth in claim 32 wherein the anode chambers constitute the bottom portion of said U-shaped passageway, and the means for separating out heavy waste material comprises perforated belt conveyors for advancing the heavy waste to a discharge outlet while permitting fluids and light weight particles to pass through the conveyors and into the anode chambers.

34. In an apparatus for recovery and separation of minerals from waste charged ore, a member in the form of a tank having a cathode-accommodating chamber and an anode chamber below the same, an anode-forming electrode mounted in said anode chamber which is perforated to allow the passage of liquids and fine particles, means below the anode-forming electrode for delivering an electrolyte for passage through the anode-forming electrode, inlet means for delivery of ore carrying liquids into said anode chamber, a stack of cathode-forming electrodes disposed in the chamber above said anode chamber, means in the bottom of said cathode chamber for separating out waste material while permitting mineral particles and compounds thereof to migrate upwardly into the stack of cathodes, each said cathode having an associated means for collecting minerals deposited as a result of electrolytic action and means for supplying the electrodes with electric current so that separate cathodes have different voltages thereby attracting for deposit different metals.

35. In an apparatus as set forth in claim 34 wherein said cathode-forming electrodes are disposed in vertically stacked relation, each said cathode having a traveling collecting belt member mounted for cooperation therewith so that the metal particles will be trapped on the surface of the belt, and means for removing the material deposited on the belts.

References Cited
UNITED STATES PATENTS

| | | | |
|---|---|---|---|
| 989,802 | 4/1911 | Rennie | 204—109 |
| 2,825,685 | 4/1955 | Schachter et al. | 204—275 |
| 2,998,372 | 8/1961 | Wagner | 204—206 |
| 3,063,921 | 11/1962 | Leibowitz | 204—110 |
| 3,154,477 | 10/1964 | Kesler | 204—195 |
| 3,474,015 | 10/1969 | Norris | 204—151 |
| 720,186 | 2/1903 | Schwerin | 204—300 |
| 894,070 | 7/1908 | Schwerin | 204—400 |
| 2,576,362 | 11/1951 | Rimbach | 204—300 |
| 2,900,320 | 8/1959 | Metcalfe et al. | 204—300 |
| 2,956,937 | 10/1960 | Thomson | 204—300 |

TA-HSUNG TUNG, Primary Examiner

U.S. Cl. X.R.

204—98, 109, 111, 226, 242, 275, 105; 299—8, 9